(12) United States Patent
Chan et al.

(10) Patent No.: US 6,611,649 B2
(45) Date of Patent: Aug. 26, 2003

(54) VARIABLE OPTICAL ATTENUATOR WITH POLARIZATION MAINTAINING FIBER

(75) Inventors: Kwok Pong Chan, Troy, NY (US); Kim Roger LaBarge, Schenectady, NY (US)

(73) Assignee: Molecular OptoElectronics Corporation, Watervliet, NY (US)

(*) Notice: Subject to any disclaimer, the term of this patent is extended or adjusted under 35 U.S.C. 154(b) by 337 days.

(21) Appl. No.: 09/811,913

(22) Filed: Mar. 19, 2001

(65) Prior Publication Data

US 2002/0141726 A1 Oct. 3, 2002

(51) Int. Cl.[7] ............................ G02B 6/00; G02B 6/42
(52) U.S. Cl. .......................... 385/140; 385/11; 385/30; 385/31; 385/141
(58) Field of Search ............................ 385/11, 31, 140, 385/141, 30

(56) References Cited

U.S. PATENT DOCUMENTS

| 4,060,308 A | 11/1977 | Barnoski et al. ........ 350/96 C |
| 4,201,446 A | 5/1980 | Geddes et al. .......... 350/96.29 |
| 4,343,532 A | 8/1982 | Palmer ................... 350/96.19 |

(List continued on next page.)

FOREIGN PATENT DOCUMENTS

| DE | 4005557 A1 | 8/1991 | ............ G02F/1/19 |
| DE | 4343943 A1 | 6/1995 | ............ G02B/6/24 |
| EP | 0229456 A2 | 7/1987 | ............ G02B/6/28 |
| EP | 0488266 A2 | 6/1992 | ............ H01S/3/06 |
| EP | 0686867 A1 | 12/1995 | ........... G02F/1/095 |
| EP | 1035680 A2 | 9/2000 | ............ H04J/14/02 |
| EP | 1037090 A2 | 9/2000 | ............ G02F/1/01 |
| EP | 1065821 A2 | 1/2001 | ............ H04J/14/02 |
| GB | 1257825 | 12/1971 | ............ C08F/15/40 |
| GB | 2190211 A | 11/1987 | ............ G02F/1/01 |
| GB | 2184859 A | 7/1997 | ............ G02F/1/19 |
| GB | 2351625 A | 1/2001 | ............ H04J/14/02 |
| JP | 60-203904 | 10/1985 | ............ G02B/6/16 |
| JP | 06-114713 | 4/1994 | ............ G02B/6/00 |
| WO | WO 87/03676 | 6/1987 | ............ G01D/5/26 |
| WO | WO 89/01171 | 2/1989 | ............ G02B/6/26 |
| WO | WO 95/05617 | 2/1995 | ............ G02B/6/26 |
| WO | WO 00/49434 | 8/2000 | ............ G02B/6/10 |
| WO | WO 00/49438 | 8/2000 | ............ G02B/6/27 |
| WO | WO 00/49439 | 8/2000 | ............ G02B/6/28 |

OTHER PUBLICATIONS

Wagoner et al., "Blockless Fiber Optic Attenuators and Attenuation Systems Employing Dispersion Controller Polymers," pending U.S. patent application Ser. No. 09/139,787, filed Aug. 25, 1998.

Wagoner et al., pending U.S. patent application Ser. No. 09/139,832, filed Aug. 25, 1998, entitled "Blockless Techniques for Simultaneous Polishing of Multiple Fiber Optics".

Johnstone, W. et al., "Fibre Optic Modulators Using Active Multimode Waveguide Overlays" *Electronics Letters*, vol. 27, No. 11, pp. 894–896 (May 23, 1991).

(List continued on next page.)

*Primary Examiner*—Brian Healy
*Assistant Examiner*—Daniel J Petkovsek
(74) *Attorney, Agent, or Firm*—Kevin P. Radigan, Esq.; Heslin Rothenberg Farley & Mesiti P.C.

(57) ABSTRACT

An electrically controllable, variable optical attenuator (VOA) is disclosed, in which polarization maintaining fiber is employed. The fiber is modified to expose the evanescent field of optical energy transmitted therein, by removing material therefrom in a direction parallel to either the fast or slow axis of the fiber, while preserving the polarization maintaining property of the fiber. A controllable material is formed over the modified portion, to remove optical energy in response to a changeable stimulus applied, which changes the refractive index of the material. Related packaging, material composition and system aspects of the attenuator are also disclosed.

58 Claims, 7 Drawing Sheets

U.S. PATENT DOCUMENTS

| | | | |
|---|---|---|---|
| 4,387,954 A | 6/1983 | Beasley | 350/96.15 |
| 4,469,544 A | 9/1984 | Goodman | 156/345 |
| 4,469,554 A | 9/1984 | Turner | 156/657 |
| 4,630,884 A | 12/1986 | Jubinski | 350/96.15 |
| 4,630,890 A | 12/1986 | Ashkin et al. | 350/96.3 |
| 4,704,151 A | 11/1987 | Keck | 65/4.1 |
| 4,712,866 A | 12/1987 | Dyott | 350/96.3 |
| 4,753,497 A | 6/1988 | Fujii et al. | 350/96.15 |
| 4,773,924 A | 9/1988 | Berkey | 65/3.11 |
| 4,778,237 A | 10/1988 | Sorin et al. | 350/96.15 |
| 4,786,130 A | 11/1988 | Georgiou et al. | 350/96.15 |
| 4,795,233 A * | 1/1989 | Chang | 385/11 |
| 4,887,900 A * | 12/1989 | Hall | 356/464 |
| 4,906,068 A * | 3/1990 | Olson | 385/43 |
| 5,060,307 A | 10/1991 | El-Sherif | 359/173 |
| 5,067,788 A | 11/1991 | Jannson et al. | 385/2 |
| 5,078,465 A | 1/1992 | Dahlgren | 385/50 |
| 5,091,984 A | 2/1992 | Kobayashi et al. | 385/16 |
| 5,106,394 A | 4/1992 | Bramson | 51/309 |
| 5,108,200 A | 4/1992 | Nonaka et al. | 385/16 |
| 5,135,555 A | 8/1992 | Coyle, Jr. et al. | 65/12 |
| 5,136,818 A | 8/1992 | Bramson | 51/165.72 |
| 5,265,178 A | 11/1993 | Braun et al. | 385/24 |
| 5,290,398 A | 3/1994 | Feldman et al. | 156/651 |
| 5,351,319 A | 9/1994 | Ginder et al. | 385/6 |
| 5,493,629 A | 2/1996 | Stange | 385/125 |
| 5,623,567 A | 4/1997 | Barberio et al. | 385/30 |
| 5,673,351 A | 9/1997 | Clarke et al. | 385/100 |
| 5,781,675 A | 7/1998 | Tseng et al. | 385/30 |
| 5,853,969 A | 12/1998 | Harada et al. | 430/510 |
| 5,966,493 A | 10/1999 | Wagoner et al. | 385/140 |
| 6,011,881 A | 1/2000 | Moslehi et al. | 385/10 |
| 6,191,224 B1 | 2/2001 | Chan et al. | 525/195 |
| 6,205,280 B1 | 3/2001 | Wagoner et al. | 385/140 |
| 6,208,798 B1 * | 3/2001 | Morozov et al. | 385/140 |

OTHER PUBLICATIONS

Johnstone, W. et al., "Fiber–Optic Fefractometer that Utilizes Multimode Waveguide Overlay Devices," *Optics Letters*, vol. 17, No. 21, pp. 1538–1540 (Nov. 1, 1992).

McCallion, K. et al., "Investigation of Optical Fibre Switch Using Electro–Optic Interlays" *Electronic Letters*, vol. 28, No. 4, pp. 410–411 (Feb. 13, 1992).

Zhang, M. et al., "Single–mode fiber–film directional coupler" *Journal of Lightwave Technology*, vol LT–5, No. 2, pp. 260–264 (Feb. 1987).

Bergh, R. A. et al., "Single–Mode Fibre Optic Directional Coupler," *Electron. Lett.* 16 (7), 260–261 (Mar. 1980).

Birks, T.A. and Li, Y.W., "The Shape of Fiber Tapers," *IEEE J. Lightwave Techn.* 10 (4), 432–438 (Apr. 1992).

Brophy, T.J. et al., "Formation and Measurement of Tapers in Optical Fibers," *Rev. Sci. Instrum.* 64 (9), 2650–2654 (Sep. 1993).

Carrara, S. L. A. et al., "Elasto–Optic Alignment of Birefringent Axes in Polarization–Holding Optical Fiber," *Opt. Lett.* 11 (7), 470–472 (Jul. 1986).

Cordaro, M. H. et al., "Precision Fabrication of D–Shaped Single–Mode Optical Fibers by In Situ Monitoring," *IEEE J. Lightwave Techn.*, 12, (9) 1524–1531 (Sep. 1994).

Diez A. et al., "Cynlindrical Metal–Coated Optical Fibre Devices for Filters and Sensors," *Electon. Lett.* 32 (15), 1390–1392 (Jul. 1996).

Digonnet, M. J. F., et al., "Measurement of the Core Proximity in Polished Substrates and Couplers," *Opt. Lett.* 10 (9), 463–465 (Sep. 1985).

Fink, Donald G. and Christiansen, Donald, *Electronic Engineers' Handbook*, Third Edition, Ch. 24, 14–18 (1989).

Gowar, J., *Optical Communication Systems*, Ch.3, 58–77 (2d Ed. 1993).

Hussey, C.D. and Minelly, J.D., "Optical Fibre Polishing with a Motor–Driven Polishing Wheel," *Electron. Lett.* 24, 805–807 (Jun. 1988).

Kenny, R.P. et al., "Control of Optical Fibre Taper Shape," *Electron. Lett.* 27 (18), 1654–1656 (Aug. 1991).

Love, J.D. and Henry, W.M. "Quantifying Loss Minimisation in Single–Mode Fibre Tapers," *Electron. Lett.* 22 (17), 912–914 (Aug. 1986).

McCallion, K. J. and Shimazu, M., "Side–Polished Fiber Provides Functionality and Transparency," *Optoelectronics World*, S19, S20, S22 and S24 (Sep. 1998).

Morozov V. et al., "Fused Fiber Optic Variable Attenuator," *OFC 2000, 25$^{th}$ Annual Optical Fiber Communications Conference*, 22–24 (Mar. 10, 2000).

Mueller–Westerhoff, U.T. et al., "The Synthesis of Dithiolene Dyes with Strong Near–IR Absorption," *Tetrahedron* 47, 909–932 (1991).

Leminger, O.G. and R. Zengerle,"Determination of Single–Mode Fiber Coupler Design Parameters from Loss Measurements," *IEEE J. Lightwave Techn..*, LT–3 (4), 864–867 (Aug. 1985).

Pan, Ru–Pin et al., "Voltage–Controlled Optical Fiber Coupler Using a Layer of a Low–Refractive–Index Liquid Crystal with Positive Dielectric Anisotrophy," *Jpn. J. Appl. Phys.* 34, Part 1, No. 12A, 6410–6415 (Dec. 1995).

Parriaux, O. et al., "Distributed Coupling on Polished Single–Mode Optical Fibers," *Appl. Opt.* 20, 2420–2423 (Jul. 1981).

Todd, D.A. et al., "Polarization–Splitting Polished Fibre Optic Couplers," *Optical Engineering* 32 (9), 2077–2082 (Sep. 1993).

Marlow Industries, Inc., "Design Guide—Power Supplies" and "Frequently Asked Questions" www.marlow.com.

Technological Arts, Adapt912 Technical Specification Sheet (1999).

Chan et al.., "Dye–Appended Dispersion–Controlled Polymers for Broadband Fiber Optic Devices," pending U.S. patent application Ser. No. 09/628,887 filed Jul. 31, 2000.

Gordon et al., "Single Channel Attenuators," pending U.S. patent application Ser. No. 09/605,110, filed Jun. 28, 2000.

Wagoner et al., "Controllable Fiber Optic Attenuators Employing Tapered and/or Etched Fiber Sections," pending U.S. application Ser. No. 09/539,469, filed Mar. 30, 2000.

Chan et al., "Dispersion Controlled Polymers for Broadband Fiber Optic Devices," pending U.S. patent application Ser. No. 09/139,457, filed Aug. 25, 1998.

Wagoner et al., "Blockless Techniques for Simultaneous Polishing of Multiple Fiber Optics," pending U.S. patent application No. 09/139,832, filed Aug. 25, 1998.

* cited by examiner

VARIABLE OPTICAL ATTENUATOR WITH POLARIZATION MAINTAINING FIBER

CROSS-REFERENCE TO RELATED APPLICATIONS

This Application is related to the following U.S. Patent Applications:

Ser. No. 09/812,097, filed on even date herewith, entitled "FIBER OPTIC POWER CONTROL SYSTEMS AND METHODS", now U.S. Patent Application Publication 2002/0131757issued Sep. 19, 2002;

Ser. No. 09/628,887, filed Jul. 31, 2000, entitled "DYE-APPENDED DISPERSION-CONTROLLED POLYMERS FOR BROADBAND FIBER OPTIC DEVICES", now U.S. Pat. No. 6,489,399 issued Dec. 3, 2002;

Ser. No. 09/605,110, filed Jun. 28, 2000, entitled "SINGLE CHANNEL ATTENUATORS", now U.S. Pat. No. 6,483, 981 issued Nov. 19, 2002;

Ser. No. 09/539,469, filed Mar. 30, 2000, entitled "CONTROLLABLE FIBER OPTIC ATTENUATORS EMPLOYING TAPERED AND/OR ETCHED FIBER SECTIONS", now U.S. Pat. No. 6,466,729 issued Oct. 15, 2002;

Ser. No. 09/139,457, filed Aug. 25, 1998, entitled "DISPERSION CONTROLLED POLYMERS FOR BROADBAND FIBER OPTIC DEVICES", now U.S. Pat. No. 6,191,224 issued Feb. 20, 2001;

Ser. No. 09/139,832, filed Aug. 25, 1998, entitled "BLOCKLESS TECHNIQUES FOR SIMULTANEOUS POLISHING OF MULTIPLE FIBER OPTICS", now U.S. Pat. No. 6,374,011 issued Apr. 16, 2002;

Ser. No. 09/139,787, filed Aug. 25, 1998, entitled "BLOCKLESS FIBER OPTIC ATTENUATORS AND ATTENUATION SYSTEMS EMPLOYING DISPERSION TAILORED POLYMERS", now U.S. Pat. No. 6,205,280 issued Mar. 20, 2001; and Ser. No. 09/026,755, filed Feb. 20, 1998, and entitled "FIBER OPTIC ATTENUATORS AND ATTENUATION SYSTEMS", now U.S. Pat. No. 5,966,493, issued Oct. 12, 1999.

Each of these Applications is hereby incorporated by reference herein in its entirety.

TECHNICAL FIELD

The present invention relates to optical power control in optical systems, and more particularly to a variable optical attenuator ("VOA") employing polarization maintaining fiber.

BACKGROUND OF THE INVENTION

Fiber optic systems often require precise control of optical signal levels entering various system components. For example, a laser may produce an optical "carrier" signal to be modulated by an electrical signal in a modulator, fiber-coupled to the laser. It is often desirable to control the output power of the laser, because of its inherently varying level. The variable, fiber optic attenuators of the type disclosed in the above-incorporated U.S. Patent Applications, e.g., the applications entitled "BLOCKLESS FIBER OPTIC ATTENUATORS AND ATTENUATION SYSTEMS EMPLOYING DISPERSION TAILORED POLYMERS" and "CONTROLLABLE FIBER OPTIC ATTENUATORS EMPLOYING TAPERED AND/OR ETCHED FIBER SECTIONS" offer certain advantages such as direct fiber coupling, low insertion loss, spectral uniformity, and automated feedback control. The principle underlying these attenuators is access to the evanescent field of the optical signal transmitted in a fiber, through a side surface of the fiber, by e.g., side polishing, tapering and/or etching an interior portion of the fiber. The laser-modulator combination discussed above will benefit from the power control capabilities of such attenuators.

Maintaining the polarization of the optical signal is often required, and a laser-modulator combination will often employ a certain "species" of fiber, i.e., polarization maintaining (PM) fiber for this purpose. As discussed in section 6.4 of the 1998 Prentice-Hall book by Dennis Derickson entitled "Fiber Optic Test and Measurement," the term polarization maintaining refers to a class of highly linearly birefringent single mode fiber. PM fiber is typically used to guide linearly polarized light from point to point, for example, between a DFB (distributed feedback) laser diode and a lithium-niobate modulator in a high-speed telecommunication system, and in other specialized systems. Any attenuators employed in-line in PM systems must therefore also maintain polarization of the optical signal.

Fiber birefringence may be stress-induced, by placing the core between or within glass elements of different physical composition, or may originate with a purposeful asymmetry in the core geometry (form birefringence). Because the attenuators discussed above use portions of fiber which have their cross-sections intentionally modified, the polarization maintaining nature of the fiber used may be affected.

What is required, therefore, is a technique for preserving the polarization maintaining property of a fiber optic in an attenuator which, through intentional modification of the fiber structure, may otherwise affect this property.

SUMMARY OF THE INVENTION

The shortcomings of the prior approaches are overcome, and additional advantages are provided, by the present invention, which in one aspect relates to an attenuator for attenuating optical energy, having a portion of a polarization maintaining fiber optic through which the optical energy is transmitted, the portion of the fiber having a side surface through which at least some of said optical energy can be controllably extracted. The portion of the fiber is modified to allow some of said optical energy to be extracted while maintaining the polarization of the transmitted optical energy. A controllable material is formed over the side surface of the fiber optic for controllably extracting said optical energy. The controllable material controllably extracts the optical energy according to a changeable stimulus applied thereto. A housing is provided enclosing the portion of the fiber optic and the controllable material, and the portion of the fiber optic is suspended within the housing to be substantially thermally insulated by surrounding air or other effective thermal insulator in the housing.

The portion of the polarization maintaining fiber optic is symmetrically modified by removal of material therefrom in a direction perpendicular to either a fast or slow axis of the fiber. The portion of the polarization maintaining fiber optic may be polished to effect said removal. The polarization maintaining fiber optic may be a panda-type fiber with two cylindrical rods, wherein at least a portion of either or both cylindrical rods is removed in said direction perpendicular to either a fast or slow axis of the fiber.

The attenuator may further comprise a controllable heating/cooling source in operative contact with the controllable material to change the temperature thereof and a thermal sensor for sensing the temperature of the controllable material. The controllable material may have its dispersion properties tailored in accordance with those of the fiber across a given wavelength band.

Various system implementations are also disclosed, including a closed loop feedback system and/or a laser for generating the optical energy along with a modulator for modulating the optical energy.

The present invention also extends to methods for forming and using the attenuator and its associated systems.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

The present invention is directed to improved variable optical attenuator (VOA) structures, for polarization maintaining fiber systems. The attenuator system, structure and materials are first discussed, followed by a discussion of the polarization maintaining aspects of the present invention.

Attenuator System

Figure 1:
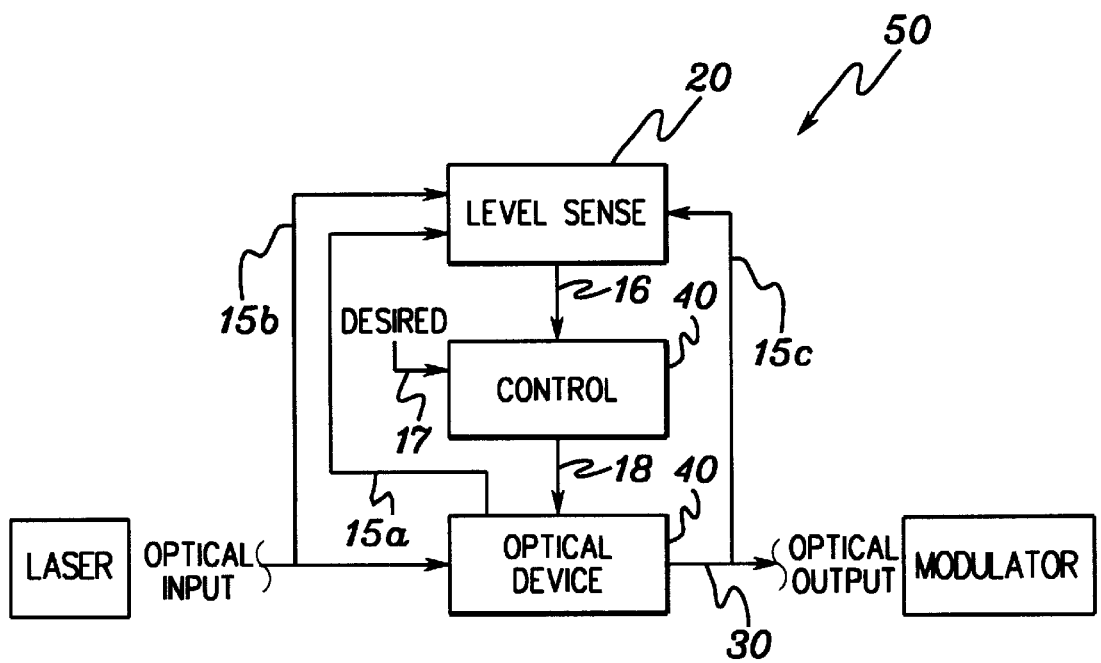
FIG. 1 is an exemplary system within which an optical power control device (e.g., attenuator) can be employed and controlled.

FIG. 1 depicts an exemplary system 50 employing a fiber optic device 10 placed in a fiber optic path 30 between an optical input (e.g., from a DFB laser) and an optical output (e.g., to a modulator). In the example disclosed herein, the optical device is an attenuator for attenuating the optical signal transmitted in the fiber optic.

The depicted system may implement a closed-loop feedback system to maintain the state of the optical device. Variants of this system were disclosed in detail in the above-incorporated U.S. Patent Applications, in connection with variable optical attenuators. Sense leads 15a–c operated by a sense unit 20 can sense a parameter in the device itself (15a) related to the optical signal level transmitted in the fiber (e.g., temperature of a thermo-optically controlled material), and/or can sense optical signal levels (15b–c) directly from the input and/or output portions of the fiber using optical taps. The optical signal level can be indirectly measured from electrical levels recovered (i.e., demodulated) from the optical signal. The fiber sense leads 15b–c can either be implemented as shown outside of the device, or inside the device using optical tap(s). For a measure of optical attenuation (i.e., the difference between the input and output optical levels), two taps are used. For a measure of only absolute, output power, only one tap is required on the output fiber portion.

The level sense unit 20 thus can provide a level stimulus or feedback signal 16 having a value related to the optical energy transmitted in the fiber optic 30, which can be used to control the characteristics of optical device in this feedback circuit. For example, a control circuit 40 can receive the feedback signal 16, a desired level stimulus 17, and by comparing the two produce a control stimulus 18 for controlling device 10.

Attenuator Structure

Figure 2:
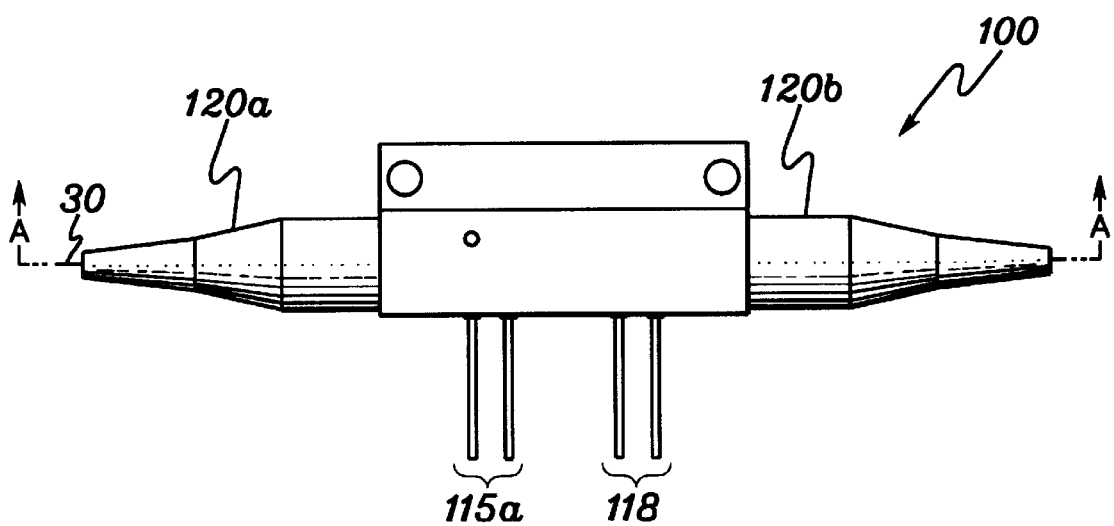
FIG. 2 is a top plan view of an exemplary controllable or variable optical attenuator.
Figure 3:
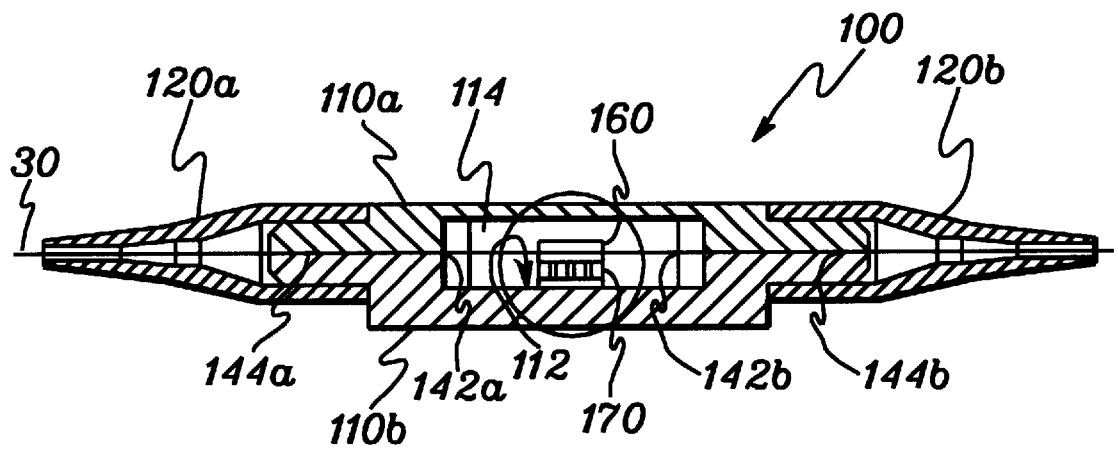
FIG. 3 is a central, cross-sectional view of the attenuator of FIG. 2.
Figure 4:
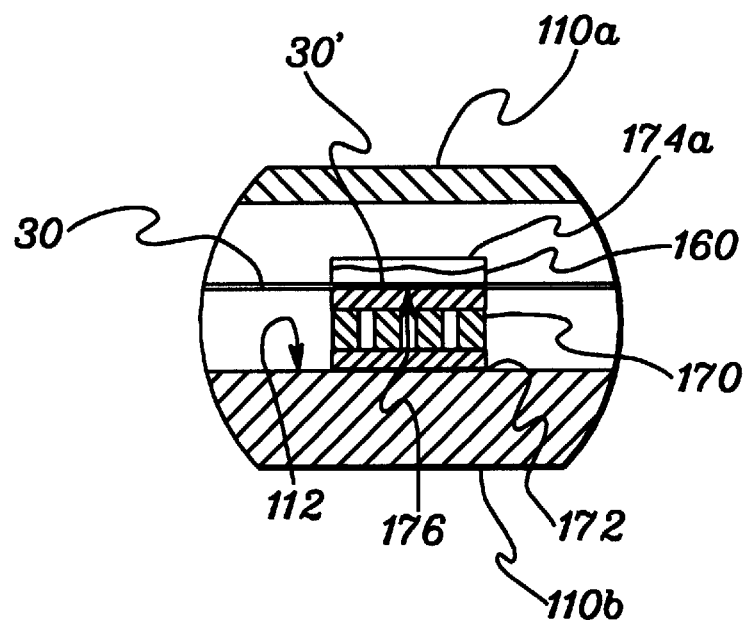
FIG. 4 is an enlarged view of certain internal features of the attenuator of FIGS. 2–3.

With reference to FIGS. 2–4, an exemplary fiber optic device in the form of variable optical attenuator ("VOA") 100 is shown, for attenuating optical energy transmitted in fiber optic 30. Attenuator 100 includes a housing comprising complementary shell pieces 110a and 110b, and strain reliefs 120a and 120b. Control leads 115a and 118 may also be provided for attenuator sense and control respectively, as discussed above with reference to the system of FIG. 1.

The attenuator is formed with respect to a portion of the fiber optic 30 having a side surface through which optical energy can be controllably extracted (e.g., polished, tapered and/or etched as discussed in the above-incorporated U.S. Applications). By maintaining the integrity of the fiber optic within this attenuator, unnecessary losses due to interruption of the fiber can be controlled. In one exemplary embodiment, the entire housing, including the strain reliefs, is 2.6 inches in length, and about 0.5 inches in width. Therefore, the attenuator of the present invention can be implemented in a relatively small package suitable for many types of system and/or field uses.

With particular reference to the central cross-sectional view of FIG. 3, a housing comprising, in one example, complementary shell pieces 110a and 110b is provided to accommodate the input and output sections of the fiber, as well as additional, internal components. When assembled, the shell pieces form a thermally insulative cavity 114 filled with air or other effective thermal insulator, with two support points 142a and 142b between which the fiber is suspended. These support points in this example are at the ends of longitudinal notches 144a and 144b formed in one or both shell pieces to accommodate the input and output portions of the fiber.

In accordance with the previously filed U.S. Applications discussed above, a bulk, controllable material, here designated 160, is formed over a surface of the fiber to controllably remove optical energy from a side surface of the fiber. Electro-optic or thermo-optic materials, for example, are appropriate for this purpose, having refractive indices, and resultant attenuation effects, which vary according to applied electrical or thermal stimuli, respectively. Shown in FIGS. 3–4 is an exemplary thermo-optic material 160 surrounding the suspended portion of fiber optic 30', and with an underlying controllable heating/cooling (heating and/or cooling) source 170 which is mounted, via for example a thermally conductive epoxy or solder 172, to an inside wall 112 of shell piece 110*b*, in cavity 114.

The suspension of the portion 30' of the fiber within only material 160, but without any other significant thermal contacts, results in an efficient, thermally insulated attenuation device such that any changes in temperature induced by the controllable heating/cooling source 170 are transferred solely, and quickly, to the thermo-optic material 160, but to no other surrounding structures. Since the fiber is suspended in a thermally insulative environment in cavity 114 (e.g., air or any other effective thermal insulator), and is in thermal contact with only material 160 and possibly with the surface of source 170, the heat sink effect of surrounding structures is minimized, and faster and more predictable control of the temperature, and therefore the optical attenuating effects, are provided.

With further reference to the enlarged view of FIG. 4, as discussed above, controllable heating/cooling source 170 is mounted to an inside housing wall 112, using epoxy or solder 172, and projects toward fiber optic portion 30'. Source 170 supports a controllable material 160 on its active control surface 176, possibly within a channel, a portion of which (174*a*) is shown. As discussed in greater detail below, a portion 30' of fiber optic 30 has a side surface along which the evanescent field of the optical energy transmitted therein is exposed, such that at least some of the optical energy can be controllably extracted therefrom, using controllable material 160.

Figure 5:
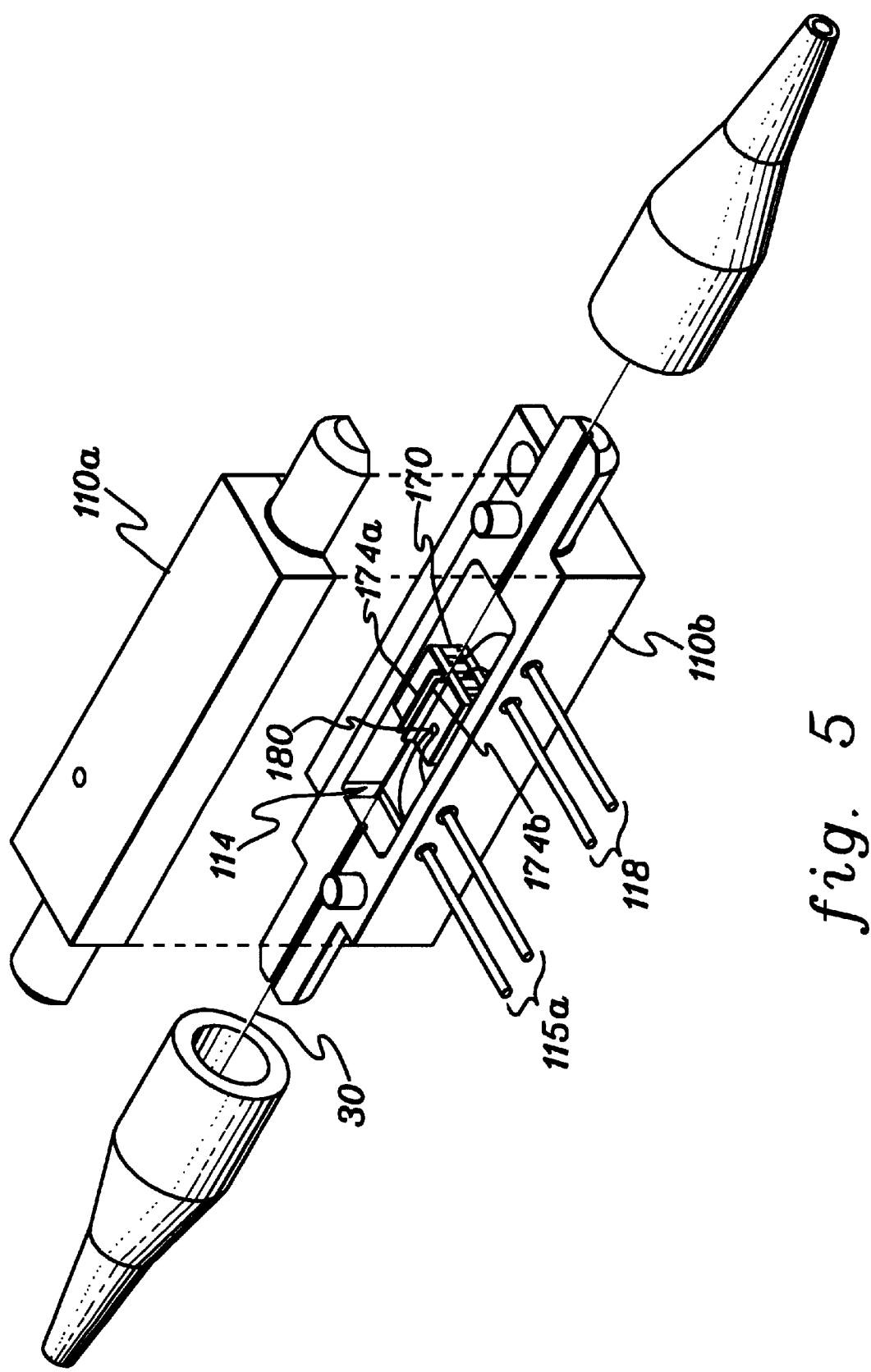
FIG. 5 is an exploded, isometric view of the attenuator of FIGS. 2–3.
Figure 6A:
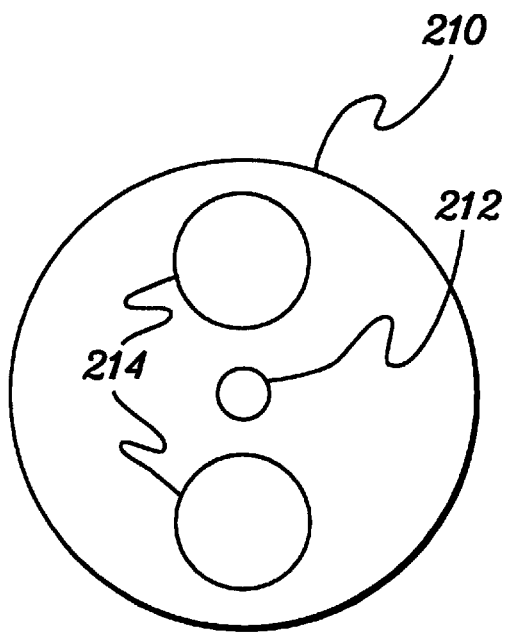
FIGS. 6a–d are sample cross-sections of polarization maintaining fibers.
Figure 6B:
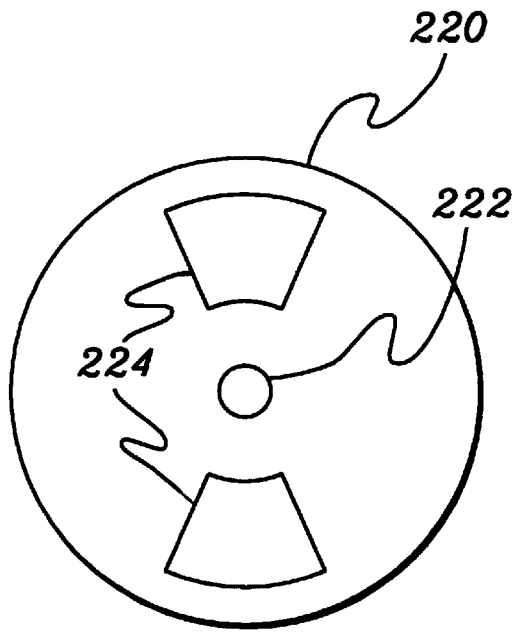
Figure 6C:
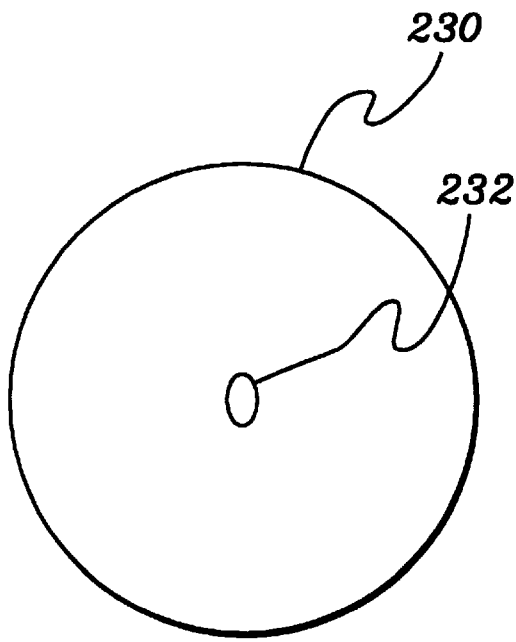
Figure 6D:
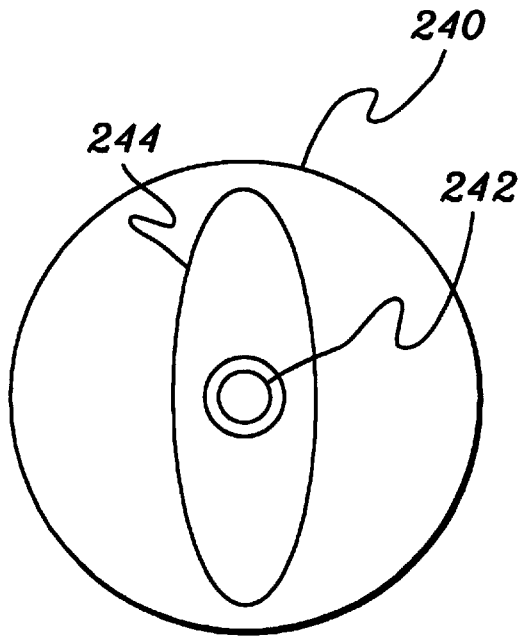

With reference to the exploded view of FIG. 5, L-brackets 174*a* and 174*b* are shown as part of, or affixed to, the heating/cooling source 170, controlled by connected leads 118. A channel may be formed by the L-brackets, in which the fiber is placed, and in which the controllable material (not shown here) can be deposited over the fiber. As discussed above, this entire assembly is substantially thermally insulated in the housing cavity 114. A sense device, e.g., temperature sensor or thermistor 180, can be placed on this assembly to sense a parameter (e.g., temperature) of the channel, source 170, and controllable material 160, which is known via calibration or otherwise to be related to the level of optical energy transmitted in the fiber optic. The signal(s) representing the temperature can be carried from the attenuator using sense leads 115*a,* and the control signals(s) to the controllable source carried to the attenuator using control leads 118.

Exemplary Controllable Materials

Improvement in the spectral uniformity of the attenuator can be obtained through proper choice of controllable material 160. Suitable controllable materials are disclosed in commonly assigned U.S. Pat. No. 6,191,224, and copending applications U.S. Ser. Nos. 09/628,887 and 09/605,110, which, as indicated above, are incorporated herein by reference. Procedures for preparing the compositions and/or commercial sources for obtaining the materials used in the compositions are fully described in the incorporated disclosures.

U.S. Pat. No. 6,191,224 discloses dispersion-controlled, refractive-index controlled polymer compositions, which are useful as controllable materials 160 in the broad wavelength region extending from about 1500 nm to about 1600 nm. The disclosed polymer compositions each comprise a polymer and an infrared absorbing dye. Typically, the polymer is a polar olefin polymer, which comprises monomeric units derived from two or more polar olefins. Usually the polar olefins, also known as "polyolefins", are acrylates, and/or they may be selected from, but are not limited to: tetrafluoropropyl acrylate, tetrafluoropropylmethacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride. The term "polar" typically refers to, e.g., the property in which the positive and negative electrical charges of the olefin monomers are permanently separated, and the term "olefin" refers to, e.g., the class of unsaturated aliphatic hydrocarbons having one or more double bonds.

Suitable infrared absorbing dyes for use in the composition include, for example, (8-((3-((6,7-dihydro-2,4-diphenyl-5H-1-benzopyran-8-yl) methylene)-2-phenyl-1-cyclohexen-1-yl) methylene)-5,6,7,8-tetrahydro-2,4-diphenyl-1-benzopyrylium tetrafluoroborate, or a metal complex dye having the general formula bis[1,2-[(4-alkyl$^1$ alkyl$^2$ amino)phenyl]-1,2-ethylenedithiolate]Met represented by structure (I)

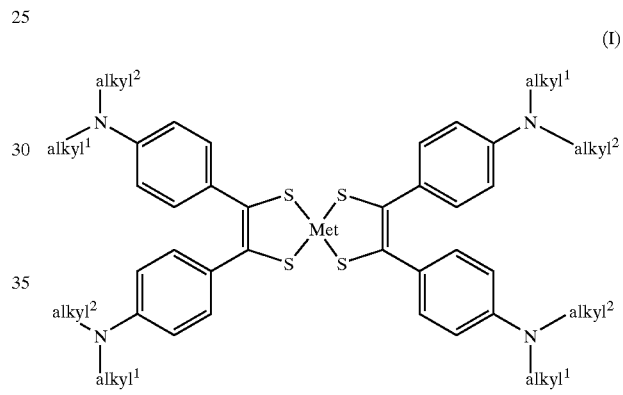

(I)

In Structure (I), alkyl$^1$ and alkyl$^2$ are each independently lower alkyls containing 2 to 8 carbon atoms. In addition, alkyl$^1$ may differ from or may be the same as alkyl$^2$. Met is a Group IIIB metal, such as nickel, palladium or platinum. Exemplary metal complex dyes include bis[1,2-(4-dibutylaminophenyl)-1,2-ethylenedithiolate ]nickel; bis[1, 2-[4-(ethyl heptyl amino)phenyl]-1,2-ethylenedithiolate] nickel; bis[1,2-(4-dibutylaminophenyl)-1,2-ethylenedithiolate ]platinum; or bis[1,2-[4-(ethyl heptyl amino)phenyl]-1,2-ethylenedithiolate]platinum.

Alternatively, for use in broadband devices, controllable material 160 may be a dye-appended polymer composition disclosed in copending, commonly assigned U.S. Ser. No. 09/628,887. These dye-appended polymer compositions include an infrared absorbing dye component and a copolymer component, which comprises at least one appended polar olefin copolymer chemically bonded to the dye component through a linking moiety attached to one chain end of the copolymer. Each appended polar olefin copolymer includes monomeric units derived from two or more polar olefins having an ester, benzene or halogen substituent attached thereto. Optionally, the copolymer component may also include a detached polar olefin copolymer mixed with the dye-appended polymer. In the detached copolymer, the monomeric units are also derived from two or more polar olefins having an ester, benzene or halogen substituent attached thereto.

Illustrative examples of dye moieties include, but are not limited to, dithiolate metal-based complex dyes having structures (II)–(VI)

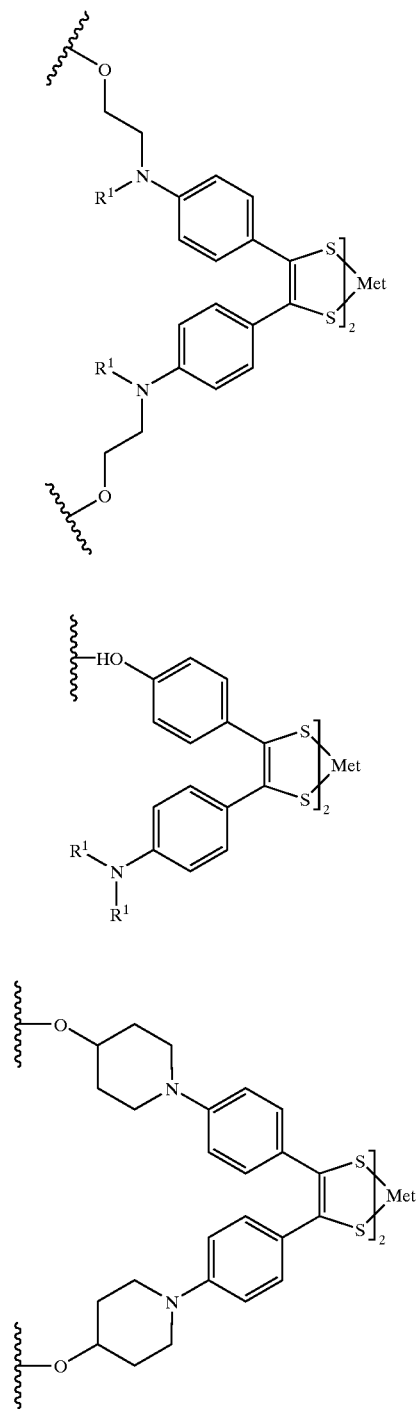

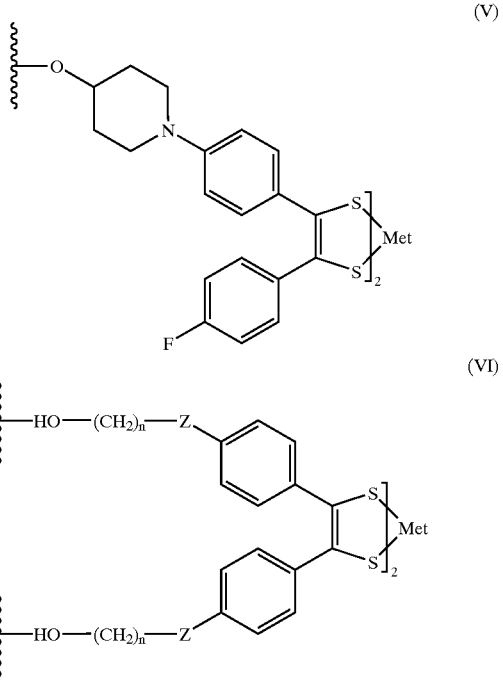

In structures (II)–(VI), each wavy line indicates a point of attachment from the dye to a linking group at the end of a polar olefin copolymer component, thereby appending the dye to the copolymer. Each $R^1$ is independently a "lower alkyl", which refers to, e.g., saturated hydrocarbon residues containing one to twelve carbons in straight or branched chains, as well as cyclic structures when possible. "Met" is as previously defined. In structure (VI), Z may be oxygen (O) or sulfur (S), and n is 2 to 12.

When controllable material 160 is one of the aforementioned dye-doped or dye-appended polymer compositions, a uniform spectral response across a broad wavelength region, e.g., 1500–1600 nm, can be obtained. However, when attenuation of light within a single channel is desired, a dye-free polymer composition, such as disclosed in commonly assigned, copending U.S. Ser. No. 09/605,110, is suitable for controllable material 160. In this embodiment, controllable material 160 is a crosslinked siloxane polymer composition formed by crosslinking an uncrosslinked vinyl-terminated dimethylsiloxane-diphenylsiloxane copolymer with a silane crosslinking agent in the presence of a platinum catalyst. The optical energy propagating through the fiber can be controllably extracted therefrom at a particular wavelength by adjusting the refractive index of the crosslinked siloxane polymer composition, either thermally or by controlling the composition of the material.

Uncrosslinked vinyl-terminated dimethylsiloxane-diphenylsiloxane copolymers are represented by structural formula (VII)

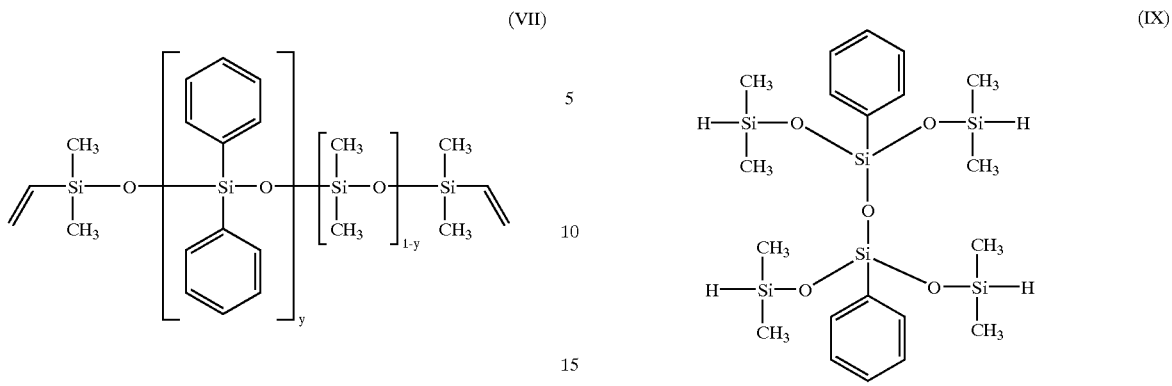

(VII)

wherein the monomer

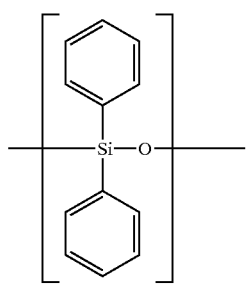

is referred to herein as "Ph$_2$SiO" or "phenyl" unit/monomer. In structure (VII), y is the mole fraction of the Ph$_2$SiO monomer, and 1-y is the mole fraction of the (CH$_3$)$_2$SiO monomer. The refractive index of the crosslinked polysiloxane composition can be controlled by varying the phenyl group content of polymer (VII).

Useful crosslinking agents include, e.g., tetrafunctional and trifunctional silanes. Particular silane crosslinking agents which result in crosslinked materials having excellent optical and thermal properties are, for example, polyphenyl-(dimethylhydrosiloxy) siloxanes and 1,3-diphenyl-1,1,3,3-tetrakis (dimethylsiloxy)disiloxane. Mixtures of the agents can also be used to crosslink vinyl-terminated polymer (VII). Polyphenyl-(dimethylhydrosiloxy) siloxanes may be represented by structure (VIII)

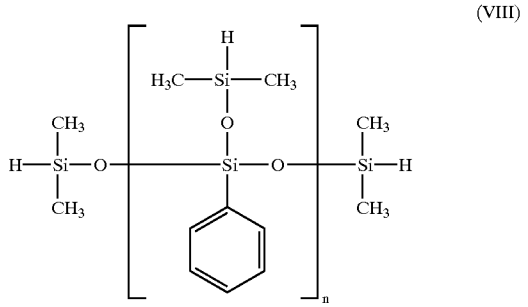

(VIII)

where n is an integer from 1 to 4. 1,3-Diphenyl-1,1,3,3-tetrakis (dimethylsiloxy) disiloxane is given by structure (IX)

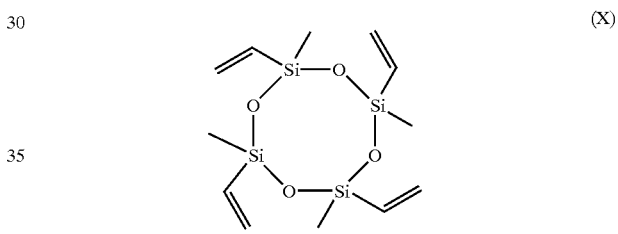

(IX)

An exemplary platinum catalyst is platinum-cyclovinylmethyl-siloxane, and the procedure for carrying out the crosslinking reaction is fully set forth U.S. Pat. Nos. 5,266,352 and 5,217,811. The resulting crosslinked siloxane copolymer (after curing) exhibits good optical properties and good gel-type integrity.

Prior to crosslinking, a catalyst inhibitor may optionally be added to the reaction mixture to extend the pot life at room temperature. One suitable inhibitor, which is commercially available is 1,3,5,7-tetravinyl-1,3,5,7-tetramethyl cyclotetrasiloxane having structural formula (X)

(X)

However, other inhibitors may be used, as will be obvious to those of skill in the art.

Polarization Maintaining Fiber Approach

As discussed above, polarization maintaining (PM) fiber may be required in certain applications. With reference to the cross sectional views of FIGS. 6a–d, various approaches to inducing the necessary birefringence in a fiber may be employed. For example, the "panda" type fiber 210 employs two cylindrical stress rods 214 above and below core 222; fiber 220 employs two symmetrically shaped rods 224 above and below core 222; fiber 230 employs an oval cross-sectioned core 232; and fiber 240 employs an elliptical member 244 around core 242.

Figure 7:
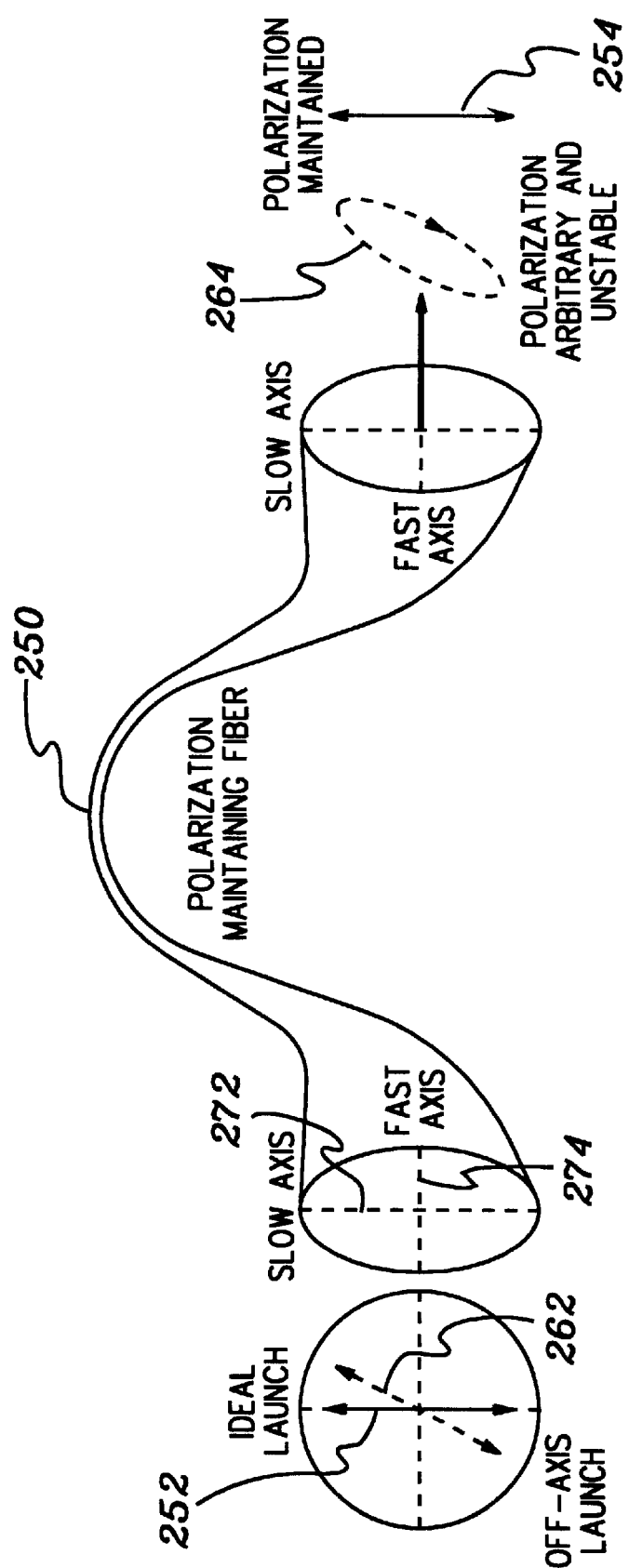
FIG. 7 depicts the operation of a polarization maintaining fiber, and the fast and slow axes thereof.

Operationally, the launch polarization sought to be maintained should be highly linearly polarized, and aligned with either of the orthogonal axes arranged in a plane perpendicular to the direction of transmission, i.e., either the "slow" or "fast" axis. With reference to FIG. 7, PM fiber 250 with its slow 272 and fast 274 axes shown, is employed to transmit either an ideal, aligned signal 262 or an off-axis launch signal 262; resulting in a polarization maintained signal 254, or an unstable signal 264, respectively.

To maintain the polarization of the optical signal, while modifying the profile consistent with the attenuator approaches above, cladding material should be removed (e.g., polished or etched), or the fiber otherwise modified, in a direction perpendicular to either the slow axis or fast axis.

Figure 8:
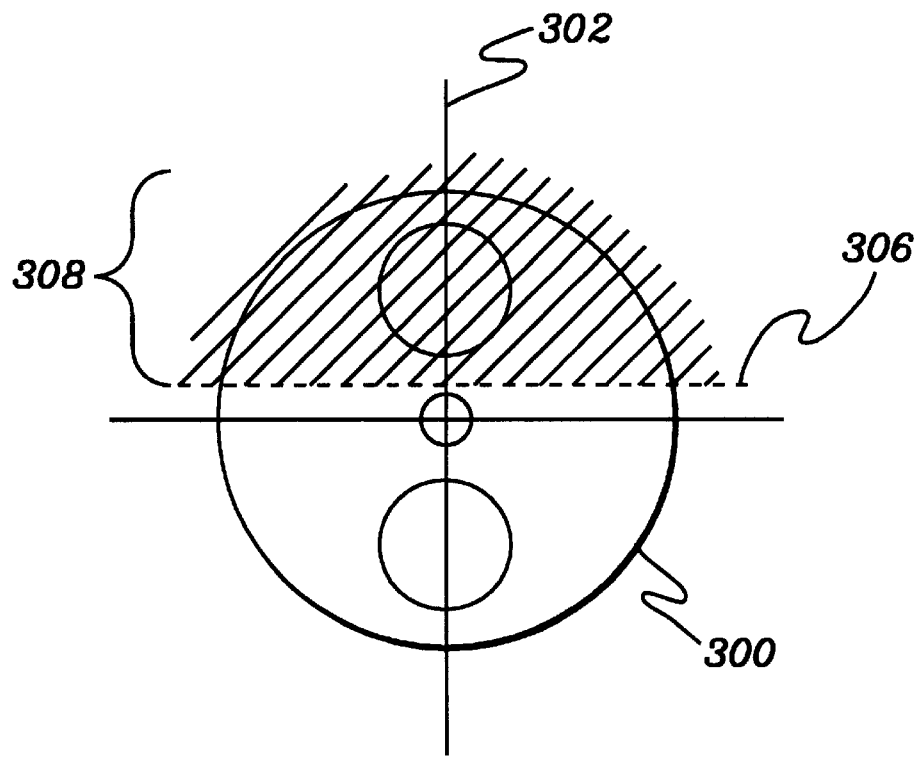
FIG. 8 depicts a first polishing profile of a "panda" type polarization maintaining fiber, perpendicular to the slow axis, in accordance with the present invention.
Figure 9:
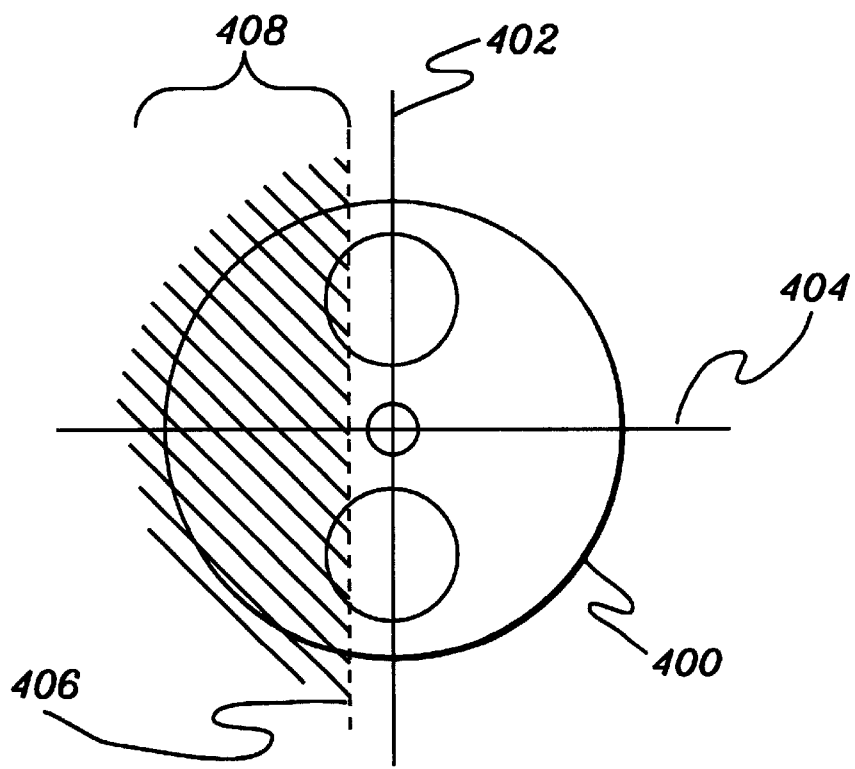
FIG. 9 depicts a second polishing profile of a "panda" type polarization maintaining fiber, perpendicular to the fast axis, in accordance with the present invention.

For example, the cross-sectional view of the dual cylindrical rod ("panda") approach of FIG. 8 shows fiber 300 with its slow 302 and fast 304 axes defined, and a polished surface 306 perpendicular to the slow axis 302 wherein hatched portion 308 is removed from the fiber. Alternatively, the cross-sectional view of FIG. 9 shows fiber 400 with its slow 402 and fast 404 axes defined, and a polished surface 406 perpendicular to the fast axis 404. By removing cladding in a direction and along a plane perpendicular to either of these symmetrical axes, the overall symmetry and therefore the polarization maintaining properties of the attenuator are maintained. If the polishing is not performed perpendicularly, the symmetry of the fiber and therefore its polarization maintaining properties, will be adversely affected. Tests have shown that the linearized optical signals launched into the modified fibers of either FIG. 8 or FIG. 9 will maintain their polarization, and regardless of whether they are launched parallel to the slow or fast axes.

To minimize deleterious stress effects of the package on the fiber, a low stress epoxy should be used to affix the fiber to the longitudinal notches 144 and/or strain reliefs 120 of FIG. 3. When mounted in the "channel" defined by the L-brackets of FIG. 3, the polished portion of the fiber need not face in any particular direction, so long as it is adequately covered by the controllable material.

Figure 10:
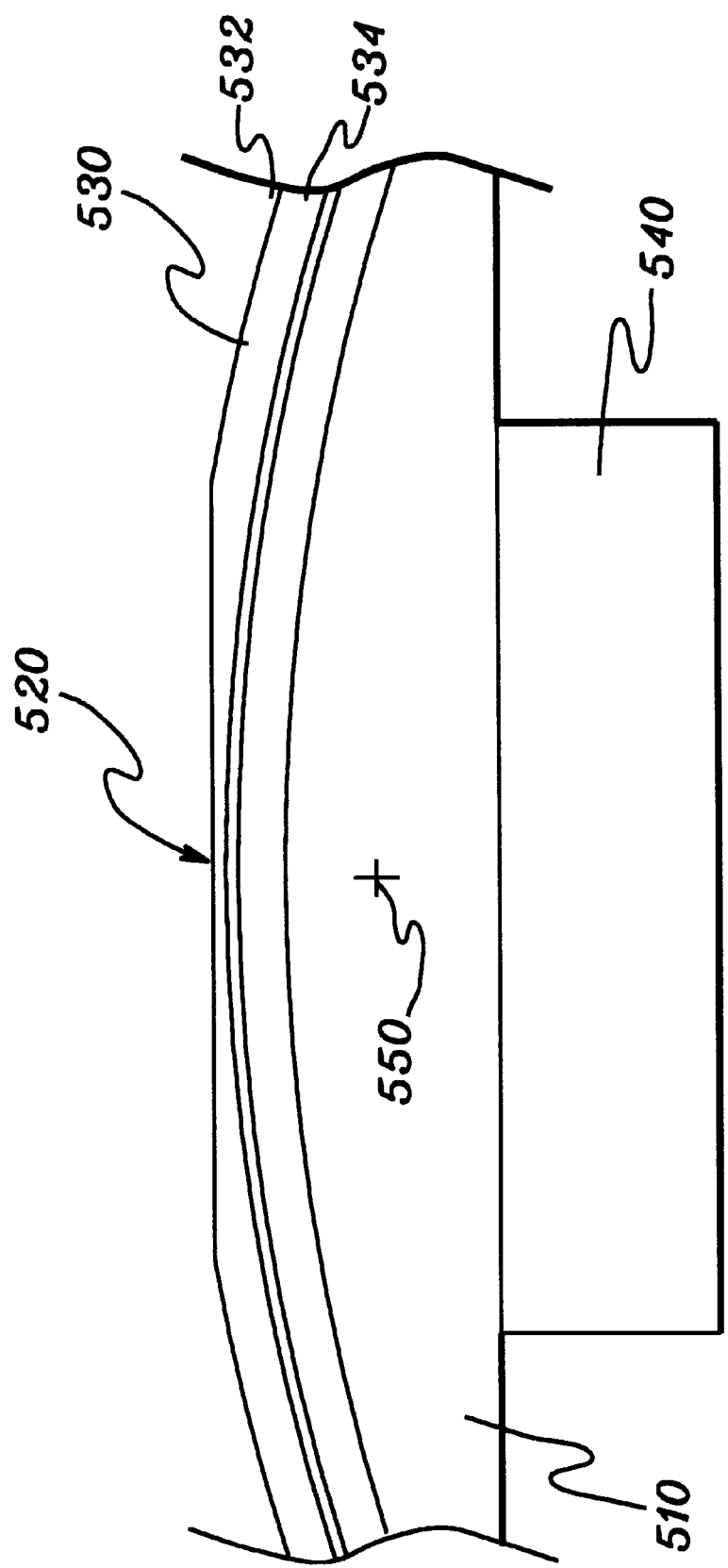
FIG. 10 depicts an exemplary apparatus used to polish the polarization maintaining fibers.

The removal of material portions 308 or 408 from the fibers of FIGS. 8–9 can be accomplished according to the principles of the above-incorporated U.S. Patent Application entitled "BLOCKLESS TECHNIQUES FOR SIMULTANEOUS POLISHING OF MULTIPLE FIBER OPTICS." For example, and with reference to the polishing apparatus of FIG. 10, portions of the fiber(s) 530 are initially stripped (i.e., any buffer layers are removed) and are placed directly on an optically-clean cylindrical lens 510 (which itself is affixed to mounting chuck 540). The fiber(s) are positioned perpendicular to the longitudinal cylinder axis 550, and can be held in place using weights, which are attached to the fiber leads and suspended to apply a nominally tangential tension. Once the desired number of fibers have been mounted, usually side-by-side for added alignment benefits, a temporary bonding medium is applied to hold the fibers in place during processing (typically a wax), and aligned properly to the axis along which the perpendicular polishing will commence. Once the bonding medium has fixed, the weights are removed and the fiber/lens/chuck assembly is mounted to a polishing fixture, and polished at their upward facing surfaces (e.g., 520—corresponding to the surfaces 306, 406 of FIGS. 8–9). To ensure uniform processing across all fibers 530, and perpendicular polishing along either the fast or slow axis, the cylindrical surface should be leveled at least along axis 550 with the polishing fixture, which is typically achieved with an angular adjustment plate.

Polishing commences first through the wax, then through the outer cladding 532 to approach the core 534, thereby exposing the upwardly facing surface (e.g., 520) and therefore the evanescent field of the optical energy to be transmitted in the fiber(s).

To determine the proper alignment and polishing depth, microscopes and/or optical verification can be used. Optical loss (coupling strength) can be measured by coating the exposed surfaces of the fibers with a high-index oil (e.g., Cargille Labs Oil, $n_D$=1.600), transmitting through the fibers an optical signal of known power, measuring a resultant optical power transmitted through the fibers and therefore the amount of power lost to the oil. Typically, about a 75–90% coupling strength is required, therefore, a 75–90% loss factor is required. The procedure for measuring the proper polishing depth is disclosed more particularly in the paper entitled "Measurement of the Core Proximity in Polished Fiber Substrates and Couplers," Optics Letters, Vol. 10, No. 9 (Sept. 1985), pp. 463–465.

Current specifications of the attenuator discussed are presented in the following table:

| Specification | Value |
| --- | --- |
| Insertion Loss | <0.15 dB |
| Return Loss | >60 dB |
| Attenuation Resolution | 0.05 dB |
| Attenuation Stability | 0.02 dB over 24 hours |
| Attenuation Range | Calibrated over 1–15 dB, Typically >45 dB |
| Wavelength Range | 1530 ĐĐ 1565 nm |
| Spectral Non-Uniformity (1530–1565 nm) | <0.3 dB @ −15 dB |
| Polarization Dependant Loss (PDL) | <0.2 dB @ −15 dB |
| Polarization Mode Dispersion (PMD) | <0.05 psec. |
| Response Time | 1 sec. 1–30 dB |
| Maximum Input/Output Power | 100 mW (1530–1565 nm) |
| Dimensions | 0.25 in. (h) × 0.25 in. (w) × 1.5 in. (l) Approx. 10 mm × 10 mm × 40 mm |
| Input/Output Fiber Type | SMF-28 with 900 micron tight buffer; or PMF |
| Connectorization | Fusion Splicing recommended |
| Operating Temperature Range | 0–70°° C. |
| Storeage Temperature | at least 0–70°° C. |

These specifications are improved by the use of the properly processed, polarization maintaining fiber disclosed herein, and advantageously render these types of attenuators highly valuable components in polarization maintaining systems.

The present invention includes the above-discussed attenuator, methods for forming and using the said attenuator, and the systems and methods for forming and using said systems. The systems may also include the laser and modulator discussed above.

While the invention has been particularly shown and described with reference to preferred embodiment(s) thereof, it will be understood by those skilled in the art that various changes in form and details may be made therein without departing from the spirit and scope of the invention.

What is claimed is:

1. An attenuator for attenuating optical energy, comprising:
    a portion of a polarization maintaining fiber optic through which the optical energy is transmitted, having a side surface through which at least some of said optical energy can be controllably extracted, the portion of the fiber being modified to allow some of said optical energy to be extracted while maintaining the polarization of the transmitted optical energy;
    a controllable material formed over the side surface of the fiber optic for controllably extracting said optical energy;
    wherein the controllable material controllably extracts the optical energy according to a changeable stimulus applied thereto; and
    a housing enclosing the portion of the fiber optic and the controllable material, and wherein the portion of the fiber optic is suspended within the housing to be substantially thermally insulated by surrounding air or other effective thermal insulator in the housing.

2. The attenuator of claim 1, wherein the portion of the polarization maintaining fiber optic is symmetrically modified by removal of material therefrom in a direction perpendicular to either a fast or slow axis of the fiber.

3. The attenuator of claim 2, wherein the portion of the polarization maintaining fiber optic is polished to effect said removal.

4. The attenuator of claim 2, wherein the polarization maintaining fiber optic is a panda-type fiber with two cylindrical rods, and wherein at least a portion of either or both cylindrical rods is removed in said direction perpendicular to either a fast or slow axis of the fiber.

5. The attenuator of claim 1, in combination with a laser for generating the optical energy and a modulator for modulating the optical energy.

6. The attenuator of claim 1, wherein the changeable stimulus comprises temperature, and wherein the attenuator further comprises:
   a controllable heating/cooling source in operative contact with the controllable material to change the temperature thereof; and;
   a thermal sensor for sensing the temperature of the controllable material.

7. The attenuator of claim 1, wherein the controllable material has its dispersion properties tailored in accordance with those of the fiber across a given wavelength band.

8. The attenuator of claim 7, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyry lium tetrafluoroborate.

9. The attenuator of claim 8, wherein said polar olefin polymer comprises monomeric units derived from an acrylate.

10. The attenuator of claim 7, wherein the controllable material comprises:
   (a) a dye component comprising a metal complex dye of nickel, palladium, or platinum; and
   (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

11. The attenuator of claim 10, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride.

12. The attenuator of claim 1, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

13. An attenuator for attenuating optical energy, comprising:
   a portion of a polarization maintaining fiber optic through which the optical energy is transmitted, having a side surface through which at least some of said optical energy can be controllably extracted, the portion of the fiber being modified to allow some of said optical energy to be extracted while maintaining the polarization of the transmitted optical energy;
   a controllable material formed over the side surface of the fiber optic for controllably extracting said optical energy;
   wherein the controllable material has its optical dispersion properties tailored in accordance with those of the fiber across a given wavelength band.

14. The attenuator of claim 13, wherein the portion of the polarization maintaining fiber optic is symmetrically modified by removal of material therefrom in a direction perpendicular to either a fast or slow axis of the fiber.

15. The attenuator of claim 14, wherein the portion of the polarization maintaining fiber optic is polished to effect said removal.

16. The attenuator of claim 14, wherein the polarization maintaining fiber optic is a panda-type fiber with two cylindrical rods, and wherein at least a portion of either or both cylindrical rods is removed in said direction perpendicular to either a fast or slow axis of the fiber.

17. The attenuator of claim 13, in combination with a laser for generating the optical energy and a modulator for modulating the optical energy.

18. The attenuator of claim 13, wherein the controllable material controllably extracts the optical energy according to a changeable stimulus applied thereto.

19. The attenuator of claim 18, wherein the changeable stimulus comprises temperature, the portion of the fiber optic and the controllable material are both positioned to be substantially thermally insulated from any surrounding structures, and wherein the attenuator further comprises:
   a controllable heating/cooling source in operative contact with the controllable material to change the temperature thereof.

20. The attenuator of claim 13, further comprising:
   a housing enclosing the portion of the fiber optic, the controllable material and the controllable heating/cooling source, and wherein the portion of the fiber optic is suspended within the housing and is substantially thermally insulated by surrounding air or other effective thermal insulator in the housing.

21. The attenuator of claim 13, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

22. The attenuator of claim 21, wherein said polar olefin polymer comprises monomeric units derived from an acrylate.

23. The attenuator of claim 13, wherein the controllable material comprises:
   (a) a dye component comprising a metal complex dye of nickel, palladium, or platinum; and
   (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

24. The attenuator of claim 23, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride.

25. The attenuator of claim 1 or 13 in combination with an attenuation system, comprising a circuit for providing a feedback signal having a value related to the optical energy transmitted in the fiber optic, wherein the controllable material controllably extracts the optical energy in accordance with said feedback signal.

26. The combination of claim 25, wherein said circuit comprises a level circuit, coupled for ascertaining a level of at least a portion of the optical energy transmitted in the fiber optic and providing a level stimulus, said level stimulus comprising said feedback signal.

27. The combination of claim 26, further comprising at least one sensor for determining said level of at least a portion of the optical energy transmitted in the fiber optic.

28. The combination of claim 27, wherein said at least one sensor comprises at least one optical sensor coupled to said fiber optic for sensing said level of at least a portion of the optical energy transmitted therein.

29. The combination of claim 28, wherein said at least one sensor comprises a thermal sensor for sensing the temperature of the controllable material.

30. A method for forming an attenuator in relation to a portion of a fiber optic through which optical energy is to be transmitted, comprising:
providing a portion of a polarization maintaining fiber optic through which the optical energy is transmitted, having a side surface through which at least some of said optical energy can be controllably extracted, the portion of the fiber being modified to allow some of said optical energy to be extracted while maintaining the polarization of the transmitted optical energy;
suspending the portion of the fiber optic in a housing;
mounting a stimulus source in the housing;
forming a controllable material on a control surface of the stimulus source, the controllable material for controllably extracting the optical energy according to a stimulus from the stimulus source; and
bringing the portion of the fiber optic into contact with the controllable material that the side surface of the portion of the fiber optic is substantially covered by the controllable material;
wherein the stimulus comprises temperature, and the portion of the fiber optic is substantially thermally insulated by surrounding air or other effective thermal insulator in the housing.

31. The method of claim 30, further comprising:
modifying the portion of the polarization maintaining fiber optic symmetrically by removal of material therefrom in a direction perpendicular to either a fast or slow axis of the fiber.

32. The method of claim 31, wherein said modifying comprises:
polishing the portion of the polarization maintaining fiber optic to effect said removal.

33. The method of claim 31, wherein the polarization maintaining fiber optic is a panda-type fiber with two cylindrical rods, and wherein at least a portion of either or both cylindrical rods is removed in said direction perpendicular to either a fast or slow axis of the fiber.

34. The method of claim 30, in combination with a method for forming a system, comprising:
providing a laser for generating the optical energy and a modulator for modulating the optical energy.

35. The method of claim 30, wherein the changeable stimulus comprises temperature, and wherein the method further comprises:
providing a controllable heating/cooling source in operative contact with the controllable material to change the temperature thereof, and;
providing a thermal sensor for sensing the temperature of the controllable material.

36. The method of claim 30, wherein the controllable material has its dispersion properties tailored in accordance with those of the fiber across a given wavelength band.

37. The method of claim 36, wherein the controllable material comprises a polar olefin polymer in admixture with a metal complex dye of nickel, palladium, or platinum, or comprises a polar olefin polymer in admixture with (8-((3-((6,7-dihydro-2,4-diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

38. The method of claim 37, wherein said polar olefin polymer comprises monomeric units derived from an acrylate.

39. The method of claim 36, wherein the controllable material comprises:
(a) a dye component comprising a metal complex dye of nickel, palladium, or platinum; and
(b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

40. The method of claim 39, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride.

41. The method of claim 30, wherein the controllable material comprises a crosslinked siloxane polymer composition produced by crosslinking a vinyl-terminated dimethylsiloxane-diphenylsiloxane copolymer with a silane crosslinking agent in the presence of a platinum catalyst.

42. A method for forming an attenuator in relation to a portion of a fiber optic through which optical energy is to be transmitted, comprising:
providing a portion of a polarization maintaining fiber optic through which the optical energy is transmitted, having a side surface through which at least some of said optical energy can be controllably extracted, the portion of the fiber being modified to allow some of said optical energy to be extracted while maintaining the polarization of the transmitted optical energy;

disposing the portion of the fiber optic in a housing;

mounting a stimulus source in the housing;

forming a controllable material on a control surface of the stimulus source, the controllable material for controllably extracting the optical energy according to a stimulus from the stimulus source; and bringing the portion of the fiber optic into contact with the controllable material such that the side surface of the portion of the fiber optic is substantially covered by the controllable material;

wherein the controllable material has its optical dispersion properties tailored in accordance with those of the fiber across a given wavelength band.

43. The method of claim 42, further comprising:

modifying the portion of the polarization maintaining fiber optic symmetrically by removal of material therefrom in a direction perpendicular to either a fast or slow axis of the fiber.

44. The method of claim 43, wherein said modifying comprises:

polishing the portion of the polarization maintaining fiber optic is to effect said removal.

45. The method of claim 43, wherein the polarization maintaining fiber optic is a panda-type fiber with two cylindrical rods, and wherein at least a portion of either or both cylindrical rods is removed in said direction perpendicular to either a fast or slow axis of the fiber.

46. The method of claim 42, in combination with a method for forming a system, comprising:

providing a laser for generating the optical energy and a modulator for modulating the optical energy.

47. The attenuator of claim 42, wherein the controllable material controllably extracts the optical energy according to a changeable stimulus applied thereto.

48. The method of claim 47, wherein the changeable stimulus comprises temperature, the portion of the fiber optic and the controllable material are both positioned to be substantially thermally insulated from any surrounding structures, and wherein the method further comprises:

providing a controllable heating/cooling source in operative contact with the controllable material to change the temperature thereof.

49. The method of claim 48, further comprising:

providing a housing enclosing the portion of the fiber optic, the controllable material and the controllable heating/cooling source, and wherein the portion of the fiber optic is suspended within the housing and is substantially thermally insulated by surrounding air or other effective thermal insulator in the housing.

50. The method of claim 42, wherein the controllable material comprises a polar olefin polymer in admixture with a metal complex dye of nickel, palladium, or platinum, or comprises a polar olefin polymer in admixture with (8-((3-((6,7-dihydro-2,4- diphenyl-5H-1-benzopyran-8-yl)methylene)-2-phenyl-1-cyclohexen-1-yl)methylene)-5,6,7,8-tetrahydro-2,4-diphenyl-1-benzopyrylium tetrafluoroborate.

51. The method of claim 50, wherein said polar olefin polymer comprises monomeric units derived from an acrylate.

52. The method of claim 42, wherein the controllable material comprises:

(a) a dye component comprising a metal complex dye of nickel, palladium, or platinum; and (b) a copolymer component comprising at least one appended polar olefin copolymer chemically bonded to said dye component through a linking moiety attached to one chain end of each said copolymer, wherein each said appended polar olefin copolymer comprises monomeric units derived from two or more polar olefins having an ester, benzene or halogen substituent attached thereto.

53. The method of claim 52, wherein the copolymer component further comprises a detached polar olefin copolymer, wherein each said dye-appended polar olefin copolymer and said detached polar olefin copolymer independently comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride.

54. The method of claim 30 or 42 in combination with a method for forming an attenuation system, comprising providing a circuit for providing a feedback signal having a value related to the optical energy transmitted in the fiber optic, wherein the controllable material controllably extracts the optical energy in accordance with said feedback signal.

55. The combination of claim 54, wherein said circuit comprises a level circuit, coupled for ascertaining a level of at least a portion of the optical energy transmitted in the fiber optic and providing a level stimulus, said level stimulus comprising said feedback signal.

56. The combination of claim 55, further comprising at least one sensor for determining said level of at least a portion of the optical energy transmitted in the fiber optic.

57. The combination of claim 56, wherein said at least one sensor comprises at least one optical sensor coupled to said fiber optic for sensing said level of at least a portion of the optical energy transmitted therein.

58. The combination of claim 56, wherein said at least one sensor comprises a thermal sensor for sensing the temperature of the controllable material.

* * * * *